United States Patent [19]

Colton et al.

[11] 3,996,423
[45] Dec. 7, 1976

[54] COMMON CONTROL FAILURE ALARM APPARATUS

[75] Inventors: John Robert Colton, Freehold; Robert Bruce Heick, Eatontown; Henry Mann, Holmdel, all of N.J.

[73] Assignee: Bell Telephone Laboratories, Incorporated, Murray Hill, N.J.

[22] Filed: Nov. 18, 1975

[21] Appl. No.: 633,108

[52] U.S. Cl. .................. 179/15 BF; 179/15 BY
[51] Int. Cl.² .......................................... H04J 3/14
[58] Field of Search ....... 179/15 BF, 15 BS, 15 BY, 179/175.2 R, 175.2 C, 175.3 S

[56] References Cited

UNITED STATES PATENTS

| 3,686,441 | 8/1972 | Thomas | 179/15 BF |
| 3,867,579 | 2/1975 | Colton | 179/15 BS |
| 3,903,371 | 9/1975 | Colton | 179/15 BS |

OTHER PUBLICATIONS

Bell Laboratories Record, Aug. 1971, "Monitoring the Performance of Digital Multiplex Circuits," by Geigel, pp. 199–200.
Bell System Technical Journal, Oct. 1972, "D2 Channel Bank ... " pp. 1659–1673.
Bell Laboratories Record, Sept. 1973, "No. 4 ESS ... " pp. 226–232.
Bell Laboratories Record, Aug. 1972, "The D3 Channel Bank," pp. 229–233.

Primary Examiner—David L. Stewart
Attorney, Agent, or Firm—John K. Mullarney

[57] ABSTRACT

A local alarm circuit and a remote alarm circuit carry out a plurality of failure monitoring and alarming functions for each of a plurality of digital groups (digroups), of time division multiplexed channels that are time multiplexed together on to a common bus. The local and remote alarm circuits utilize common control techniques and are of a similar circuit configuration. Each alarm circuit comprises an alarm timing store having a shared recirculating memory, and an alarm status store with a shared recirculating memory. The timing store serves to integrate and time failure indications for each of the digroups, and the status store maintains a continuing real time record of the alarm status for each digroup. When the timing store counts out a predetermined failure duration for a given digroup, the alarm status record for the digroup is changed and an alarm signal is generated. Once an alarm is registered for a digroup, the timing store then serves to integrate and time failure-free indications for the digroup. That is, it counts out a predetermined failure-free duration (after appropriate maintenance action has been taken) before it terminates the alarm state record in the status store and the alarm signal.

8 Claims, 7 Drawing Figures

MEMORY CELL

COMMON CONTROL FAILURE ALARM APPARATUS

BACKGROUND OF THE INVENTION

This invention relates to failure monitoring and alarming apparatus which utilizes common control circuitry to carry out a plurality of failure alarm functions for each of a plurality of digital groups, of time division multiplexed channels, that are time multiplexed together on to a common transmission link.

In the past, pulse code modulation (PCM) digital data terminals have typically performed failure monitoring and alarming tasks (as well as framing detection, reframing, etc.) on a per "digroup" basis — a digroup or digital group comprising a plurality of time division multiplexed PCM messages and multiplexed framing and signaling bits. For example, the failure alarm circuitry for the Bell System's D2 Channel Bank comprises an alarm control circuit and a carrier group alarm, each of which is distributed over a single digital group. The alarm control unit senses failures which occur in the local terminal, in the far end terminal, and in the T1 lines joining the two terminals. The carrier group alarm circuit functions under the direction of the alarm control unit. Any activity by the alarm control which reflects an out-of-frame condition for the digroup, supply voltage failure, circuit failure at either terminal, or line failures causes the carrier group alarm to initiate a sequence of events which results in the stopping of service charges and the withdrawal of the affected digroup from service for the duration of the trouble. The per digroup partitioning of the failure alarm (and other) functions has heretofore resulted in efficient terminal design.

With increasing digital traffic, it is not uncommon now to find proposals for multiplexing a plurality of digroups for transmission to a remote location over a common transmission facility or alternatively for multiplexing a plurality of received digroups on to a common bus at a switching center. These two cases are somewhat analogous and present the same problem with regard to failure alarm. Conventional practice would suggest carrying out the failure alarm functions on a per digroup basis using plural alarming circuits to respectively monitor the plurality of multiplexed digroups and their associated circuits. The obvious disadvantage of this approach is, of course, its complexity and costly redundancy in failure alarm circuitry.

SUMMARY OF THE INVENTION

It is the primary object of the present invention to carry out the failure alarm functions for each of a plurality of time division multiplexed digital groups and their related circuits in accordance with common control techniques.

A related object of the invention is to provide common time-shared circuitry which performs a plurality of failure monitoring and alarming functions for each of a plurality of time division multiplexed digroups and their related circuits.

The failure alarm circuitry of the invention can be advantageously utilized, by way of example, in a large scale, time division switching machine such as the proposed Bell System's No. 4 ESS. The plurality of PCM encoded digital data groups transmitted to a No. 4 ESS office will be respectively stored a frame at a time and then read out from store in a sequence such that a plurality (5) of $n$-channel ($n = 24$) digroups are time multiplexed on to a common bus.

The failure monitoring and alarming apparatus of the present invention utilizes common control circuitry to carry out a plurality of failure alarm functions for each of the plurality of multiplexed digroups, as well as a virtual digroup of test time slots, on a time multiplexed basis. To perform the requisite failure alarming functions on a common control basis, a common control local alarm circuit and a common control remote alarm circuit are used. The local alarm circuit serves to monitor selected failures at the local terminal, such as an out-of-frame condition of one ore more digroups, local power supply failures, etc. The remote alarm circuit is used to detect an indication of failure in either the far end terminal or in the transmission being sent to the far end. The local alarm circuit and the remote alarm circuit are of a similar circuit configuration.

Each alarm circuit comprises an alarm timing store having a shared recirculating memory, and an alarm status store also with a shared recirculating memory. The timing store serves to integrate and time failure indications for each of the digroups, as well as for the virtual or test digroup. The status store maintains a continuing real time record of the alarm status for each digroup. When the timing store counts out a predetermined failure duration for a given digroup, the alarm status record for the digroup is changed to the alarm state and an alarm signal is generated. Once an alarm is registered for a digroup, the timing store then serves to integrate and time normal or failure-free indications for the digroup. That is, it counts out a predetermined failure-free duration (after appropriate maintenance action has been taken) before it terminates the alarm state recorded in the status store and the alarm signal. Thus, the timing store may be timing the duration of a failure indication for one or more digroups, while simultaneously timing or counting out a failure-free duration for one or more other digroups.

The generation of a local or remote alarm signal by the failure alarm apparatus results in the stopping of service charges and the withdrawal of the affected digroup(s) from service for the duration of the trouble. The local alarm generated by the local alarm circuit is also used to advise the far end terminal of the local failure.

An advantageous feature of the invention is the facility with which maintenance tests can be carried out. By the use of the test time slots, the common control circuitry that is shared by all digroups can be continually tested, while in service, and failures in the same can thus be quickly detected.

A still further feature of the invention is that the common control approach leads to a substantial savings in complex circuitry, and the circuitry is more easily adapted to integrate circuit design.

BRIEF DESCRIPTION OF THE DRAWINGS

The invention will be more fully appreciated from the following detailed description when the same is considered in connection with the accompanying drawings in which.

DETAILED DESCRIPTION

Figure 1:
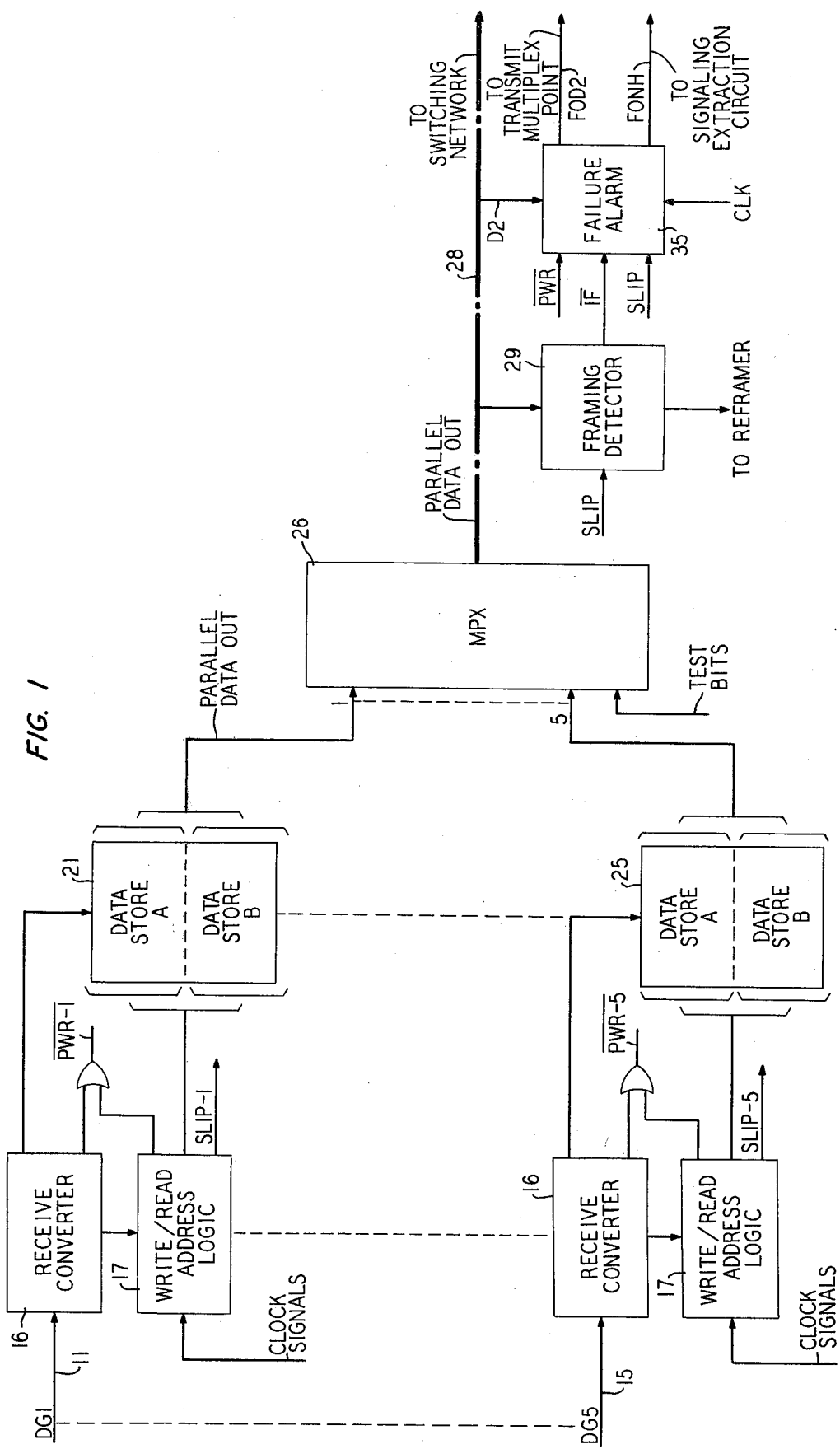
FIG. 1 shows a simplified schematic block diagram of a portion of a time division switching machine incorporating the failure alarm circuitry of the present invention.

Turning now to FIG. 1 of the drawings, there is shown part of a time division switching system that incorporates failure alarming circuitry in accordance with the invention. For purposes of illustration, the system of FIG. 1 embodies many of the features and aspects of the No. 4 ESS; see the article "No. 4 ESS - Long Distance Switching for the Future" by G. O. Johnson, *Bell Laboratories Record*, September 1973, pages 226–232. It is to be understood, however, that the switching system itself constitutes no part of the present invention and it will be obvious to those in the art that the inventive concepts here disclosed can be used with other and different time division switching systems. And, as heretofore suggested, the present invention can also find use in the analogous situation wherein a plurality of digroups are multiplexed together for transmission to a remote location over a common transmission facility. The incoming transmission line 11 carries a digital group (digroup) of separate and distinct messages in a typical time division multiplexed fashion. Again for purposes of illustration, the data transmitted over line 11 can be assumed to have a format similar to the data format transmitted to a No. 4 ESS office over a T-1 transmission line (see, for example, the article "The D3 Channel Bank" by W. B. Gaunt et al. *Bell Laboratories Record*, August 1972, pages 229–233). This data format is shown in an abbreviated form, in the expanded view of digroup 2, in FIG. 2 (top) of the drawings. The format consists of 24 8-bit words and one framing bit for a total of 193 bits per frame. The 24 words typically represent 24 separate and distinct messages deposited in 24 separate and distinct channels 0 – 23. The words are PCM (pulse code modulation) encoded and the least significant bit (i.e., the eighth bit) of a channel is periodically dedicated for signaling purposes. This dedication is discussed in detail in the article by Gaunt et al, supra, but it is of no consequence in the consideration of the present invention. The PCM ecoded data words can represent encoded voice or video information, digital data from a data set, etc. As suggested in FIG. 2, and as will be described in detail hereinafter, five working digroups of 24 channels each are multiplexed on to a 128 time-slot bus. Of these 128 time-slots or channels, 120 time-slots are utilized for traffic (5 × 24 = 120) and 8 are spares that may be used for maintenance testing and the like.

Each received digroup (DG1-DG5) is delivered to a respective receive converter circuit 16 which includes a clock recovery circuit (not shown) that recovers the line timing of the incoming T1 line and serves to generate coincident clock pulses at the incoming line rate (1.544 MHz). These clock pulses are respectively delivered to each write-read address logic 17. Each converter 16 serves to regenerate the received digital bits degraded in transmission, it converts the same from a bipolar to a unipolar format, and it further serves to convert each of the successive digital words (W0 – W23) to a parallel bit format to permit a parallel write in of the channel bits into the data stores A and B.

The output coincident clock pulses of the converters 16 are serially delivered to the write/read address logic circuits 17 which comprise digit and word counters (not shown). The word counter of each logic circuit 17 counts through twenty-four words and then recycles. Assuming an in-frame situation, this word counter will count from 0 through 23 in time coincidence with the appearance of data words W0 through W23 at the output of the associated receive converter 16. Thus, the word counter indicates the "address" (e.g., the position in the frame) of each data word.

The data stores A and B are each organized as a 24 word by 10 bits per word random access memory. When a digroup is in frame, the A and B data stores each store a complete frame of data including the framing bit plus a parity bit for each channel of the frame. Successive frames of incoming data are alternately written into the A and B stores, with the successive data words in a frame written into successive storage locations as the write address successively increments from 0 to 23. Each receive data store comprises a static MOS (metal oxide semiconductor) store with random access memory and conventional address decoding logic.

Figure 2:
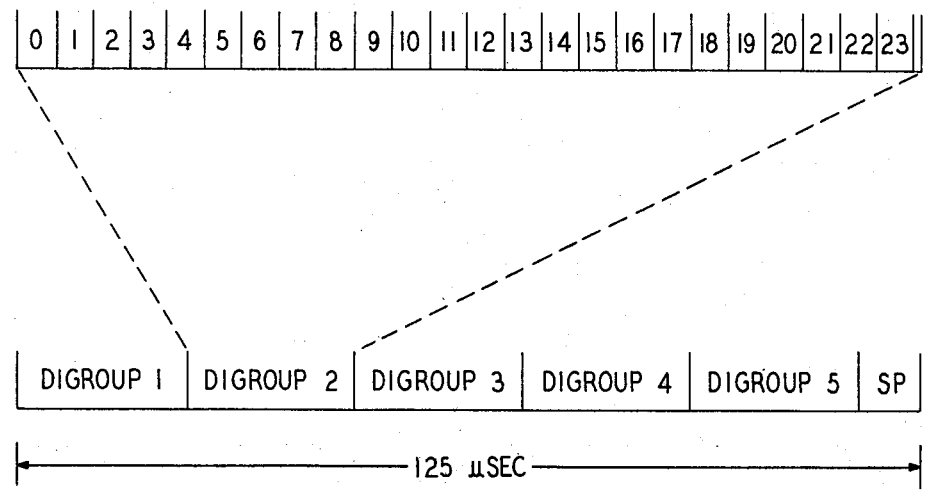
FIG. 2 illustrates the data format of a typical incoming multiplexed line.

The line transmission rate is given as 1.544 MHz, there are 193 bits per frame, and the duration of each line frame is 125 microseconds, which is subdivided into channels of 5.18 microseconds each. This frame duration, in turn, establishes the internal frame duration of the switching office at a corresponding 125 microseconds. The office 125 microsecond frame is divided into 128 time periods, referred to herein as time-slots or channels. Five digroups of 24 channels each are multiplexed on to a 128 time-slot bus, in the manner to be described, leaving 8 spare time-slots. These spare time slots are used for maintenance test purposes, e.g., the spare time slots can be used to test the common control failure alarm circuitry while the same is in service operation. Each write cycle or write operation requires an entire frame (125 microseconds). However, since five digroups are multiplexed on to a common bus in the same time duration (125 microseconds), as illustrated in FIG. 2 (bottom), the read cycle of a given digroup is only about 20 percent of the time required for a write cycle.

Amongst other clock signals, the office clock (not shown) provides generated word code, clock signals that serve to define the 128 time-slots of the office frame. These latter clock signals are delivered to the address logic circuitry 17 which decodes the same and develops successive cycles of 24 counts each, with each cycle of 24 counts serving to enable a read out of the data from a given one of the data stores 21 through 25. Thus, for example, as the read address logic 17 associated with the first digroup (DG1) increments through a count of 0 through 23, a frame of data in either store A or store B of data store 21 is read out; for the next cycle of 24 counts (24 through 47) a frame of data of digroup DG2 is read out, . . . and for the last cycle of 24 counts (96 – 119), a frame of data in either store A or B of data store 25 is read. After five successive count cycles of 24 counts each, the operation is interrupted for a period of eight time-slots (i.e., time-slots 120 – 127 which are spares) and then it repeats.

The read address signal developed by each logic circuit 17 includes an RA/RB signal (read A/read B) which serves to alternately enable the read out from stores A and B for a given digroup. More specifically, the square waveform of each RA/RB signal is such that data is typically read out of stores A and B in an alternate fashion and read out is generally phase shifted with respect to write in such that the read out of one store (A) occurs simultaneously with the write in to the other (B), and vice-versa.

The recovered line timing used to write the data stores for a given line may not "locked" or synchronized to the office timing used to read these stores and consequently more or less information may be written into the stores than is read out of them. A slip control circuit (not shown), which is part of each address logic 17, deals with this problem by either discarding a frame of stored data or double-reading a frame of stored data, depending upon the relative drift between the read and write cycles. More specifically, if a given recovered line frequency used to write a pair of data stores A and B is greater than the office frequency used to read these stores, the slip control operates on the read cycle to cause a deletion of a frame of data (i.e., a frame of data is discarded). Alternatively, if the recovered line frequency is somewhat less than the office frequency, the slip control operates on the read cycle to cause a double-reading of a frame of data (i.e., a frame of data is repeated). A frame deletion or repetition is termed "slip" and the determination of this slip or drift, as well as the direction thereof, is accomplished by comparing the read and write cycles for a digroup. A slip operation is indicated by a signal on the slip output lead of a respective address logic circuit 17.

The described slip operation achieves synchronization at a switching office, in an essentially asynchronous communication network, with a minimal of resultant impairment to the transmitted signals. A frame of multiplexed data comprises a plurality of distinct message words in distinct multiplexed channels of the frame and therefore one occasional lost or duplicated digital word per message is not significant. Moreover, because the network clocks of the distinct offices are approximately synchronous, the frequency of a frame deletion or double-reading is small and it is always exactly one frame of data that is affected.

As the read address logic circuitry 17 successively increments through five cycles of twenty-four counts each, the data stores of five digroups are read in succession and the digroups time multiplexed together in multiplexer 26 to form a multiplexed bit stream as depicted in FIG. 2 (bottom). Thus, the 24 channels of digroup DG1 are read, then the 24 channels of digroup DG2, and so on for the other three digroups. The eight spare time slots (SP) separate the data of channel 23 of digroup DG5 from channel 0 of digroup DG1. The data words are read out of store in a parallel format and they remain in a parallel format on the common bus 28. The circuitry that is recited above and that is further shown in block form in FIG. 1 is disclosed in detail in U.S. Pat. No. 3,867,579, issued Feb. 18, 1975 to J. R. Colton and H. Mann.

The time division multiplexed digital data groups are delivered to a switching network (not shown) over the common multiplex bus 28. The framing detector 29 continually and independently monitors, at the multiplex point, all of the digital groups (and the test digroup) on a time multiplexed basis. Briefly, the framing detector 29 examines each digroup for frame synchronization by comparing the framing bits thereof against a locally generated framing pattern. If the comparison is successful, the digroup is in-frame and no corrective action need be taken. If the comparison fails, however, an out-of-frame condition is indicated and a "hunting" precedure is initiated by sending an appropriate signal to a reframer. The framing detector 29 is disclosed in detail in U.S. Pat. No. 3,903,371, issued Sept. 2, 1975 to J. R. Colton-R. B. Heick-H. Mann.

Figure 3:
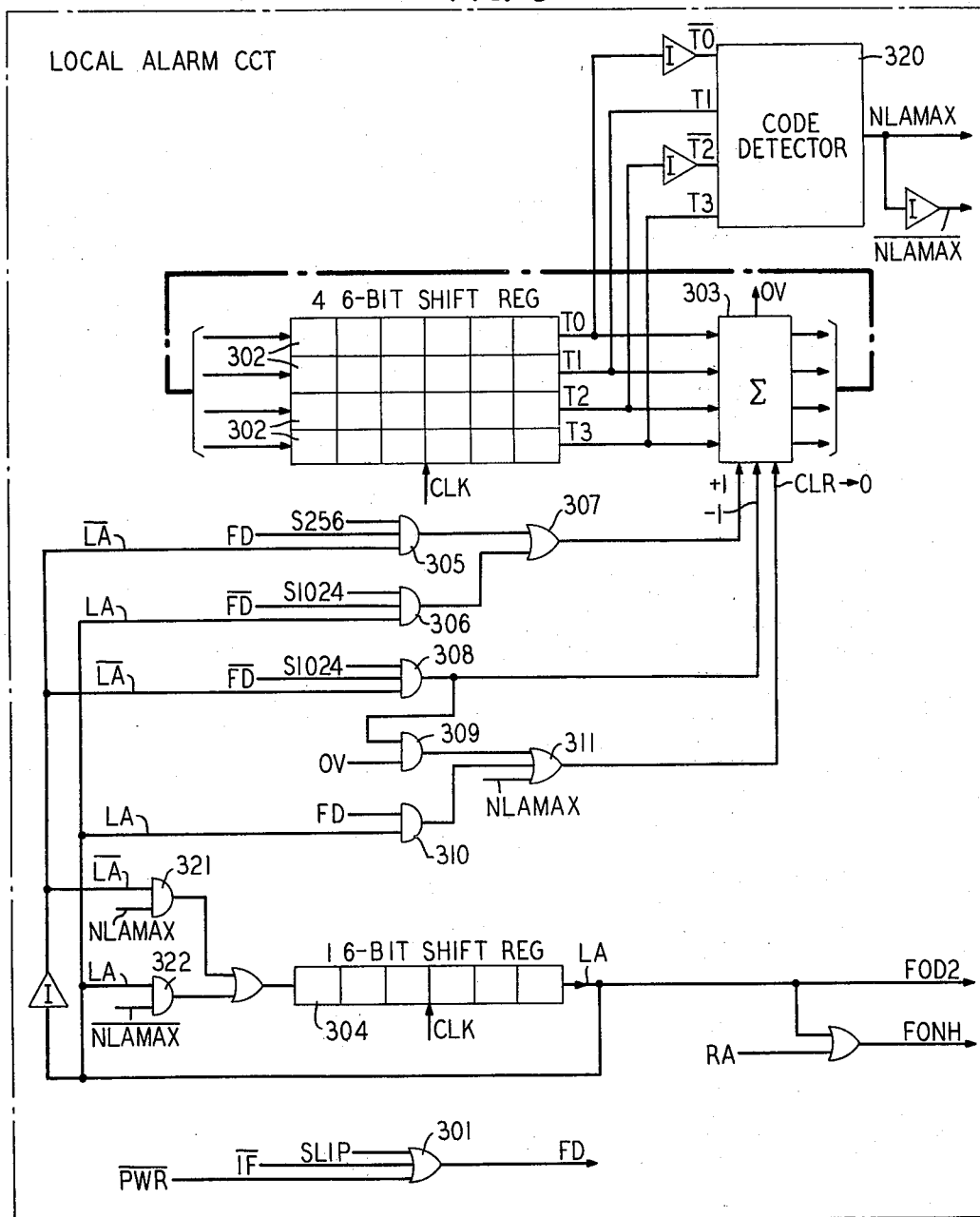
FIG. 3 is a detailed schematic diagram of a local alarm circuit in accordance with the invention.
Figure 5:
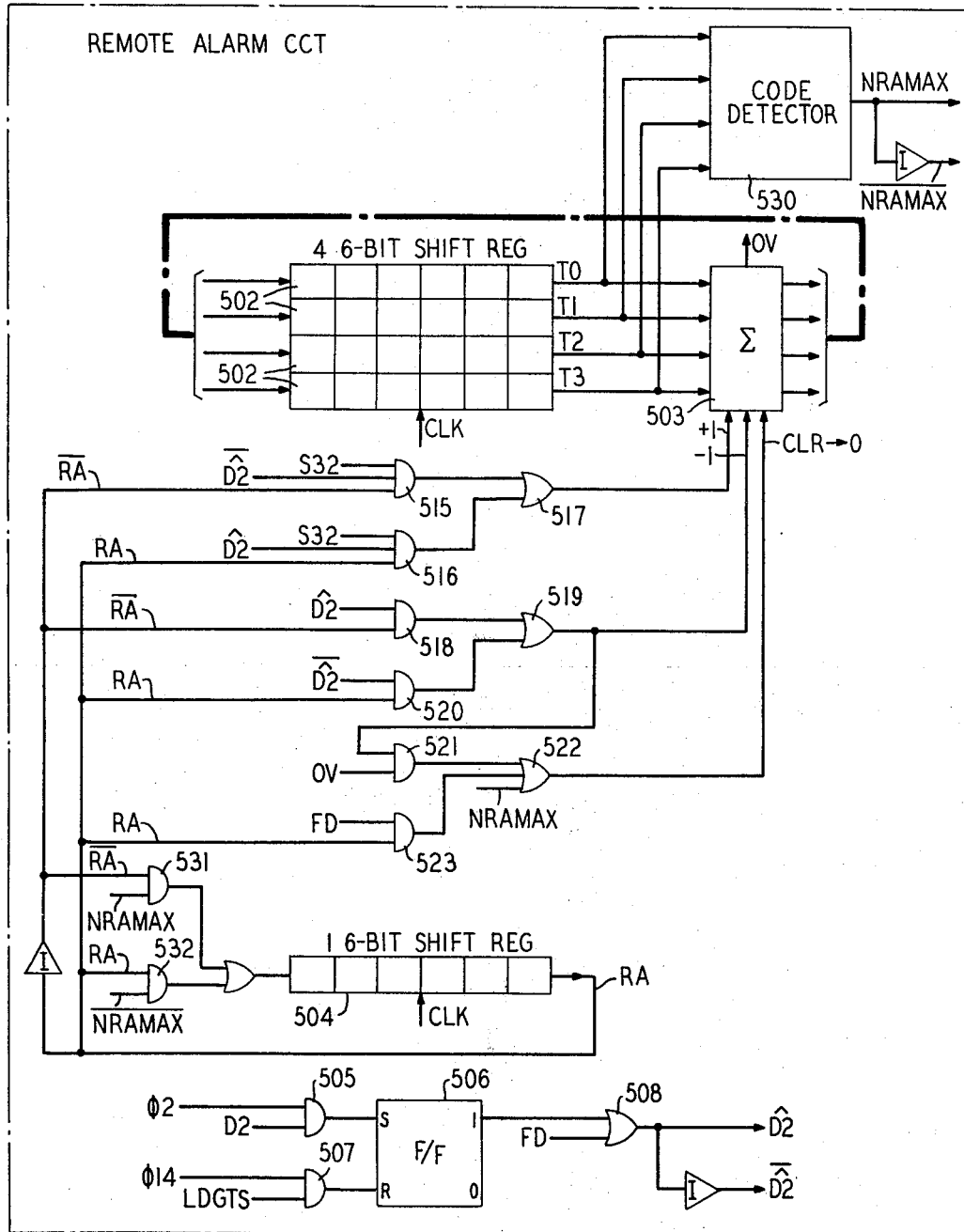
FIG. 5 is a detailed schematic diagram of a remote alarm circuit in accordance with the invention.

The failure alarm apparatus 35 of the present invention comprises a local alarm circuit, shown in detail in FIG. 3, and a remote alarm circuit, shown in detail in FIG. 5. The local alarm circuit serves to monitor selected failures at the local terminal, such as the out-of-frame condition of a digroup, an unacceptably high slip rate for a digroup, a local failure (e.g., a loss of power) in a digroup's receive circuitry, etc.

The framing detector 29 continually monitors all of the multiplexed digroups for frame synchronization and when an out-of-frame condition of a digroup is discovered the detector 29 sends an out-of-frame indication ($\overline{IF}$) to the failure alarm 35. The $\overline{IF}$ or out-of-frame signals, if any, are presented to the failure alarm circuitry in time coincidence with the presence of the multiplexed digroups on the common bus — i.e., the $\overline{IF}$ signals of the respective digroups are presented to the failure alarm in similar time multiplexed fashion. The same is true for the other signals (e.g., SLIP-1 . . . SLIP-5) also delivered to the failure alarm 35.

Frame deletion or repetition (i.e., SLIP) will impair signal transmission if it is of a particularly high rate and hence it too should be monitored. To this end, the slip signals (SLIP-1 . . . SLIP-5) that are generated by the respective address logic circuits 17 are coupled to the failure alarm apparatus 35, where they are used in the manner to be described. By way of further example, the receive circuitry (i.e., converter 16 and logic 17) for the respective digroups may be cyclically scanned for loss of power ($\overline{PWR}$) and the resultant signals ($\overline{PWR}$-1 . . . $\overline{PWR}$-5) delivered to the failure alarm apparatus 35. In addition to the above examples, it will be evident to those in the art that there are a number of other digroup functions and facilities which might also be monitored for a failure condition, such as the signaling subframe pattern for each digroup. Accordingly, the invention should in no way be considered as limited to the specific monitoring tasks that are recited herein for illustrative purposes.

The remote alarm circuit of the failure alarm apparatus serves to monitor for failure in the far end terminal or in the transmission being sent thereto. When a failure exists in either the far end terminal (e.g., a D3 Channel Bank, such as described in the above cited article) or in the transmission being sent to the far end, the far end circuitry forces the transmitted D2 bits to be zero ("0") for all channels in the digroup. This is established operating procedure. The received D2 bits are continually monitored by the remote alarm circuit at the receive multiplex point, i.e., the D2 bit stream output lead of the parallel data output bus 28 is hard-wire connected to the failure alarm apparatus 35.

When a local or remote failure is registered by the failure alarm apparatus, a force on-hook signal (FONH) is provided and used to simulate the on-hook condition for all channels in the troubled digroup(s). This signal terminates service charges and withdraws the affected digroup from service. The other output signal of the failure alarm apparatus 35 is the force digit 2 signal (FOD2) which is sent to the outgoing multiplex bus (not shown) to force the transmitted D2 bits to be zero. This alerts the remote terminals to a local alarm condition.

Turning now to the local alarm circuit of FIG. 3, the failures that are monitored at the local terminal (e.g., IF, SLIP, $\overline{PWR}$ ...) are ORed in gate 301 to form an overall failure detection (FD) indication. This FD failure signal is sampled periodically (e.g., every 256 milliseconds) and the samples delivered to an alarm timing store which comprises four six-bit shift registers 302 and a four-bit binary adder 303 connected end-to-end in a loop configuration. The registers 302 can store a binary coded failure count from 0 to 15 for each of the five working digroups and the test digroup. Four bits are, of course, required to register a binary coded count of 9 or more and hence the need for four parallel shift registers. At any point in time, the corresponding cells of the registers 302 will temporarily store the failure count for a given digroup. Also, to store a failure count for all five working digroups and the test digroup, the shift registers 302 must be of 6-bit length. The binary adder 303 is used to increment and decrement the accumulated count for each digroup. The adder 303 may also be set to the all zeros (0000) state by the overriding clear-to-zero (CLR → 0) lead. Shift registers and binary adders are well known in the art and hence no detailed description thereof is considered necessary. The shift registers 302 are shifted by clock (CLK) signals derived from the office clock (not shown) and which shift the stored data at the beginning of time-slots 0, 24, 48, 72, 96 and 120. Thus, for example, at the beginning of time-slot 0 of the office cycle or frame, the binary coded failure count of digroup DG1 will appear at the output of the shift registers 302 and the stored counts of the other digroups will be advanced one cell position toward the output. The binary coded failure count of digroup DG1 is incremented or decremented by the binary adder 303 and then returned to the input of the registers 302 where it is subsequently advanced or shifted once again toward the register output. At the beginning of time-slot 24 of the office cycle, the failure count of digroup DG2 will be shifted to the output of the shift registers 302 from where it is coupled to the binary adder 303. Concurrently therewith, the stored counts of the other digroups are each advanced in the registers 302 one cell position. In this fashion, the binary coded count for all of the digroups, including the test digroup, will be continually advanced through the shift registers 302 and then fed back to the input stages thereof via the binary adder 303.

Figure 7:
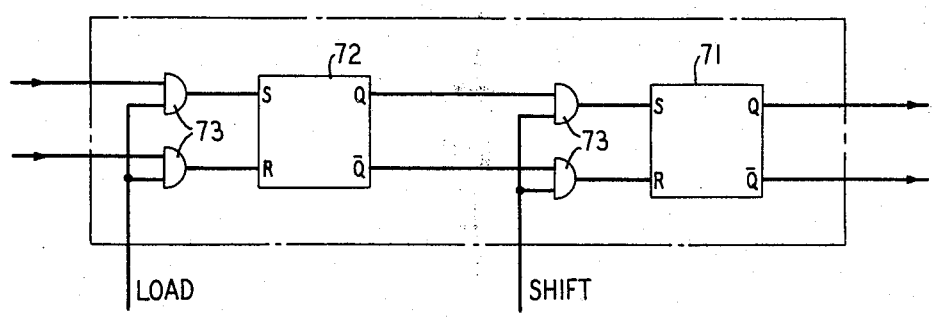
FIG. 7 is a schematic diagram of a single memory cell of which all of the 6-bit shift registers of FIGS. 3 and 5 are comprised.

The shift registers 302, as well as the status store shift register 304, are each comprised of six memory cells, with each cell configured as shown in FIG. 7. A typical memory cell consists of a pair of tandem coupled flip-flops 71 and 72 and the clock gate logic 73. A binary digit is read into the input flip-flop 72 during each of the last, digroup time-slots and the data is shifted from flip-flop 72 to the output flip-flop 71 during each of the first, digroup time-slots. Thus, the shift occurs during time-slots 0, 24, 48, 72, 96 and 120 of the office cycle, while the read in or "load" for each cell occurs during the preceding time-slots 127, 23, 47, 71, 95 and 119 of the office cycle.

The combinational AND-OR logic 305-311 of FIG. 3 serves to increment, decrement, and "clear-to-zero" the count which is registered in the alarm timing store 302–303 in response to the FD failure indications or the absence thereof ($\overline{FD}$). The other input signals to the combinational logic comprise a local alarm signal (LA) or the absence of local alarm ($\overline{LA}$), derived from the local alarm status store 304, and the S256 and S1024 signals which respectively sample the failure indications every 256 and 1024 milliseconds.

When a digroup is not in a local alarm condition (i.e., when $\overline{LA}$=1), the alarm timing store is used to integrate and time the local failure indication. Thus, when $\overline{LA}$=1, if FD=1, during S256 sample time, one count (+1) is added to the alarm timing store 302–303 for that digroup; this function is provided by the AND gate 305. However, with $\overline{LA}$=1, if FD=0 during a S1024 sample time, one count (−1) is subtracted, unless the alarm timing store is already in the all zeros state for that digroup; i.e., with $\overline{LA}$=1 and FD=0 (i.e., $\overline{FD}$=1) the AND gate 308 is enabled each S1024 sample time and a decrement signal (−1) is delivered to the adder 303. But, if the alarm timing store is already in the all zeros (0000) state, a decrement signal will immediately produce an overflow signal (OV) from the binary adder 303 which when ANDed in gate 309 with the decrement signal serves to deliver an overriding clear-to-zero signal to the adder. This prevents the timing store from being decremented past the all zeros state. When a digroup is not in a local alarm condition (i.e., when $\overline{LA}$=1), the alarm timing store is thus incremented at a 256 millisecond rate and decremented at a 1024 millisecond rate. This rate difference is an intentional bias which assures an overall failure count accumulation when the failure detection (FD) indication is erratic — for example, as with a fifty percent inframe duty cycle for a digroup.

When the accumulated failure count for a digroup reaches a predetermined maximum number (e.g., 10), the local alarm state is generated (LA=1) and the alarm timing store is cleared. To this end, the code detector or decoder 320 is connected to the output of the shift registers 302, in the illustrated manner, and when the binary coded count output reaches ten the code detector 320 produces the output signal NLA-MAX (in binary notation, NLAMAX=1010, corresponding to a time interval of 2.56 seconds). The NLA-MAX signal is delivered to the AND gate 321 to change the alarm status for the digroup to the local alarm condition (LA), and it is further coupled through the OR gate 311 to the clear-to-zero lead.

The alarm status store maintains a continuing real time record of the local alarm status for each active digroup, as well as for the test digroup. This record is stored in the six-bit shift register 304, which is clocked (CLK) and configured in the same fashion as the previously described six-bit shift registers 302. For a digroup in the local alarm condition a binary one bit is stored (LA=1), while for a digroup not in local alarm a binary zero is stored (LA=0, and $\overline{LA}$=1). Normally, the stored LA=1 and LA=0 states are simply recycled in the status store register 304 via the AND gate 322. However, when the accumulated failure count for a digroup not in local alarm ($\overline{LA}$) reaches the predetermined maximum count, as heretofore described, the AND gate 321 is enabled to write a binary one bit into store and thus change the stored alarm status for the digroup to the local alarm state (LA=1).

When a digroup is in the local alarm condition (LA=1), the alarm timing store is used to integrate and time the local failure-free indication (FD=0). Thus, when LA=1, if FD=0 ($\overline{FD}$=1) during a S1024 sample time, one count (+1) is added to the alarm timing store 302–303 for that digroup; this function is performed by the AND gate 306. However, with LA=1, if FD=1 (indicataive of a failure indication) the alarm timing store is immediately cleared-to-zero; this function is performed by AND gate 310. If the accumulated count for a digroup reaches NLAMAX (NLAMAX=1010, corresponding now to a time of 10.24 seconds) with LA=1, the local alarm condition is removed and the alarm timing store is cleared. The NLAMAX signal is delivered to the AND gate 321 as before, but the gate is disabled because $\overline{LA}$=0. Thus, a binary zero is stored (LA=0) in register 304 and the local alarm status of the digroup now reflects the not in local alarm condition (LA=0).

Before a digroup is returned to the working or active state, it is important that its local failure-free condition be established with certainty. This accounts for the long timing period (10.24 seconds) before a digroup in the local alarm condition LA=1 is returned to the LA=0 status.

Figure 4:
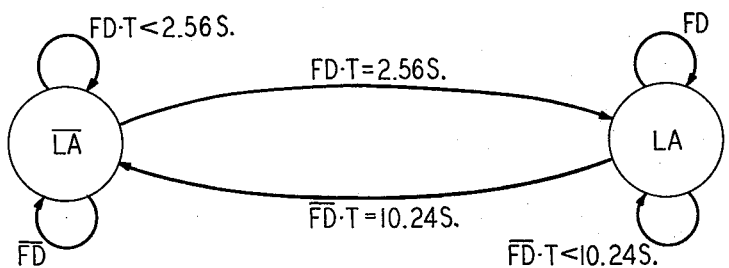
FIG. 4 is a state diagram that is descriptive of the operation of the circuit of FIG. 3.

FIG. 4 shows the state diagram for the local alarm circuit of FIG. 3. Any digroup can be in either of the two states LA or $\overline{LA}$. If the state of a digroup is $\overline{LA}$, the digroup remains in that state in the absence of a failure detection (FD) indication, as indicated by the closed loop designated $\overline{FD}$. When an FD failure indication is present, the alarm timing store begins to count out a predetermined duration (e.g., 2.56 seconds), during which time the digroup state is unchanged; this is indicated by the closed loop bearing the Boolean expression FD·T<2.56s. When the alarm timing store does count out for the determined duration, the state of the digroup is changed to LA; this transition is indicated by the arrow designated FD·T=2.56s. Once the local alarm (LA) state is registered for a digroup, the timing store then serves to integrate and time the failure-free ($\overline{FD}$) indications for the same. When the state of a digroup is LA, the digroup remains in that state in the presence of an FD indication (as indicated by the closed loop designated FD). However, in the absence of an FD indication ($\overline{FD}$=1), the alarm timing store begins to count out a second predetermined duration (e.g., 10.24 sec.), during which time the digroup state is unchanged. This is indicated by the closed loop labeled $\overline{FD}$·T<10.24s. When the alarm timing store does count out for the second predetermined duration, the state of the digroup is returned to $\overline{LA}$; this transition is indicated by the arrow designated $\overline{FD}$·T=10.24s.

In the typical situation, the alarm timing store will be in the all zeros condition for most, or all, digroups, it may be timing a failure indication for one or more other digroups, and perhaps simultaneously timing out a failure-free duration of still another digroup(s).

The remote alarm circuit of FIG. 5 is of an overall circuit configuration similar to that of the local alarm circuit. The remote alarm comprises an alarm timing store, including four six-bit shift registers 502 and a binary adder 503 connected in a loop configuration, and an alarm status store, consisting of the six-bit shift register 504. The shift registers 502 and 504 are clocked (CLK) and configured in the same way as the previously described six-bit shift registers 302 and 304.

As explained heretofore, when a failure exists in either the far end terminal or in the transmission being sent to the far end, the far end circuit forces the transmitted D2 bits to be zero for all channels in the digroup. The received D2 bits are monitored by the remote alarm circuit at the receive multiplex point. The multiplexed D2 bits on the D2 lead of the common bus 28 are delivered to the AND gate 505. Each of the 128 time-slots of the office frame are divided into sixteen phases ($\phi1$, $\phi2$, ... $\phi16$) and the D2 bits presented to gate 505 are sampled each time-slot by a $\phi2$ pulse. The output of AND gate 505 is used to set the flip-flop 506 to its "1" state. The $\phi14$ pulse that is generated during the latter part of each of the last digroup time-slots (LDGTS), i.e., time-slots 23, 47, 71, . . . , serves to enable AND gate 507 and thereby reset flip-flop 506 if it had been set to its "1" state. The "1" output lead of flip-flop 506 is delivered to the OR gate 508, the output of which is designated $\hat{D}2$. The other input to OR gate 508 — the FD indication from the local alarm circuit — can be disregarded for the present. Now if, but only if, all the D2 bits for a particular digroup are in the zero state, then $\hat{D}2$=0 for that digroup. This, of course, is indicative of a failure in the far end terminal or in the transmission being sent thereto.

The combinational AND-OR logic 515–522 serves to increment, decrement, and clear-to-zero the count which is registered in the alarm timing store 302–303 in response to the remote failure indications ($\hat{D}2$=0) or the absence thereof ($\hat{D}2$=1). The other input signals to the combinational logic comprise a remote alarm signal (RA), or the absence of remote alarm ($\overline{RA}$), derived from the remote alarm status store 504, and the S32 signals which sample the $\hat{D}2$ indications every 32 milliseconds.

When a digroup is not in a remote alarm condition (i.e., when $\overline{RA}$=1), the remote alarm timing store is used to integrate and time the remote failure indication. Thus, when $\overline{RA}$=1, if $\hat{D}2$=0 ($\hat{D}2$=1) during a S32 sample time, one count (+1) is added to the alarm timing store 502–503 for that digroup; this function is provided by the AND gate 515. However, with $\overline{RA}$=1, if $\hat{D}2$=1 (indicative of a failure-free condition) one count (−1) is substracted, unless the alarm timing store is already in the all zeros state for that digroup; i.e., with $\overline{RA}$=1 and $\hat{D}2$=1 the AND gate 518 is enabled at the office frame rate (every 125 microseconds) and a decrement signal (−1) is delivered to the binary adder 503. But, if the alarm timing store is already in the all zeros (0000) state, a decrement signal will immediately produce a overflow signal (OV) from the adder 503 which when ANDed in gate 521 with the decrement signal serves to deliver an overriding clear-to-zero signal to the adder. This prevents the timing store from being decremented past the all zeros state. When a digroup is not in a remote alarm condition (i.e., when $\overline{RA}$=1), the alarm timing store is thus incremented at a 32 millisecond rate, and decremented at the frame rate of 125 microseconds since $\overline{RA}$ for any one digroup is presented to gate 518 at this frame rate. Thus, the alarm timing store is rapidly decremented if $\hat{D}2$=1 (indicative of a failure-free condition for a given digroup).

When the accumulated failure count for a digroup reaches a predetermined maximum number (e.g., 15), the remote alarm state is generated (RA=1) and the alarm timing store is cleared. To this end, the code detector or decoder 530 is connected to the output of the shift registers 502, in the illustrated manner, and when the binary coded count output reaches fifteen the code detector 530 produces the output signal NRA- MAX (in binary notation, NRAMAX=1111, corresponding to a time interval of 480 milliseconds). The NRAMAX signal is delivered to the AND gate 531 to change the alarm status for the digroup to the remote alarm condition (RA), and it is further coupled through the OR gate 522 to the clear-to-zero lead.

The remote alarm status store maintains a continuing real time record of the remote alarm status for each active digroup, as well as for the test digroup. This record is stored in the six-bit shift register 504. For a digroup in the remote alarm condition a binary one bit is stored (RA=1), while for a digroup not in remote alarm a binary zero is stored (RA=0, and $\overline{RA}$=1). Normally, the stored RA=1 and RA=0 states are simply recycled in the status store register 504 via the AND gate 532. However, when the accumulated failure count for a digroup not in remote alarm ($\overline{RA}$) reaches the predetermined maximum count, as heretofore described, the AND gate 531 is enabled to write a binary one bit into store and thus change the stored alarm status for the digroup to the remote alarm state (RA=1).

When a digroup is in the remote alarm condition (RA=1), the remote alarm timing store is used to integrate and time the remote failure-free indication ($\hat{D2}$=1) Thus, when RA=1, if $\hat{D2}$=1 during a S32 sample time, one count (+1) is added to the alarm timing store 502–503 for that digroup; this function is performed by the AND gate 516. However, with RA=1, if $\hat{D2}$=0 (indicative of a remote failure indication), the alarm timing store is decremented (−1) at the frame rate, unless the timingn store is already in the all zeros state for that digroup; i.e., with RA=1 and $\hat{D2}$=0 ($\overline{\hat{D2}}$=1) the AND gate 520 is enabled and a decrement signal (−1) is delivered to the adder 503. If the accumulated count for a digroup reaches NRAMAX (i.e., a count of 15, or 480 milliseconds) with RA=1, the remote alarm condition is removed and the alarm timing store is cleared. The NRAMAX signal, from detector 530, is delivered to the AND gate 531 as before, but the gate is disabled because $\overline{RA}$=0. Thus, a binary zero is stored (RA=0) in register 504 and the remote alarm status of the digroup now reflects the not in remote alarm condition (RA=0).

Figure 6:
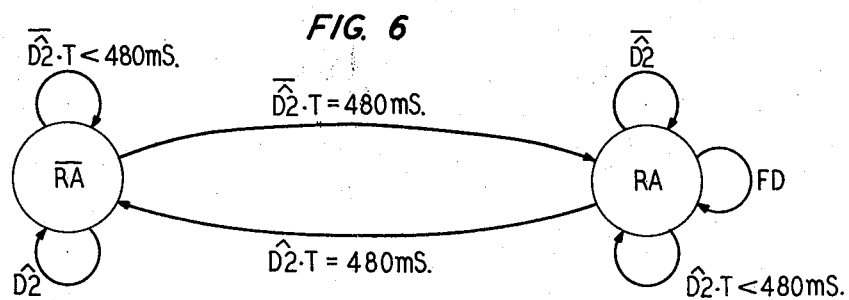
FIG. 6 is a state diagram that is descriptive of the operation of the circuit of FIG. 5.

FIG. 6 shows the state diagram for the remote alarm circuit of FIG. 5. Any digroup can be in either of the two states RA or $\overline{RA}$. If the state of a digroup is $\overline{RA}$, the digroup remains in that state in the absence of a remote failure ($\hat{D2}$=0) indication, as indicated by the closed loop designated $\hat{D2}$ ($\hat{D2}$=1 in the absence of failure). When a $\hat{D2}$=0 failure indication is present, the alarm timing store begins to count out a predetermined duration (e.g., 480 milliseconds), during which time the digroup state is unchanged; this is indicated by the closed loop bearing the Boolean expression $\hat{D2}$·T<480 ms. When the alarm timing store does count out for the given duration, the state of the digroup is changed to RA; this transition is indicated by the arrow designated $\hat{D2}$·T=480ms. Once the remote alarm (RA) state is registered for a digroup the timing store then serves to integrate and time the failure-free ($\hat{D2}$=1) indication for the same. When the state of a digroup is RA, the digroup remains in that state in the presence of a $\hat{D2}$=0 failure indication, as indicated by the closed loop designated $\hat{D2}$. However, when a failure-free indication ($\hat{D2}$=1) is present, the alarm timing store begins to count out the aforementioned predetermined duration (e.g., 480 milliseconds), during which time the digroup state is unchanged. This is indicated by the closed loop labeled $\hat{D2}$·T<480ms. When the alarm timing store does count out for the predeterminend duration, the state of the digroup will be returned to $\overline{RA}$; this transition is indicated by the arrow designated $\hat{D2}$·T=480ms. In the RA state, the presence of an FD signal from the local alarm circuit maintains the remote alarm circuit inthe RA state, as indicated by the arrow designated FD. This FD override will be explained hereinafter.

Since the remote alarm circuit operates in response to a signal (D2=0) from the far end terminal that it (the far end) has gone into local alarm (or alternatively from LA to $\overline{LA}$) the response of the remote alarm circuit should be fairly rapid, but not so rapid as to prevent a false triggering into the Ra (or alternatively the $\overline{RA}$) state. The remote alarm state transition timing disclosed herein (approximately ½ second) is nicely suited to this purpose. It should be understood, however, that the local and remote alarm transition timing intervals disclosed herein are only by way of example and other and different intervals can be readily realized through the appropriate selection of sampling pulses and the binary coded count, code detector.

A local alarming condition is of much greater significance to the local terminal than a remote alarm condition. Accordingly, a local alarming condition is given priority over remote alarm. More specifically, the failure detection (FD) indication of the local alarm circuit of FIG. 3 is delivered to the remote alarm of FIG. 5 to "freeze" the state of the latter. That is, if the remote alarm circuit is not in remote alarm (i.e., $\overline{RA}$=1) it is maintained in $\overline{RA}$, and if it is in the remote alarm condition RA it is kept in RA. The FD signal from the circuit of FIG. 3 is delivered to the OR gate 508 and hence when FD=1, then $\hat{D2}$=1. With $\overline{RA}$=1 for a given digroup, this $\hat{D2}$=1 signal serves to rapidly decrement the remote alarm timing store to the all zeros state; this function is provided by AND gate 518. Thus, the remote alarm circuit is maintained in the $\overline{RA}$ state in the presence of an FD=1 signal. Alternatvely, when the remote alarm circuit is in the RA state for a given digroup, an FD=1 signal serves to enable AND gate 523 and thereby clear-to-zero the count of the alarm timing store for that digroup. This is indicated in FIG. 6 by the closed loop designated FD, the FD indication serving to maintain the RA state for a digroup for the duration of FD.

The LA signal from the status store, shift register 304 of FIG. 3 is utilized at the transmit multiplex point (not shown) as a force digit 2 signal (FOD2). That is, when LA=1 for a given digroup the D2 bits on the D2 lead of the transmit multiplex bus are forced to zero (D2=0) for all channels in the digroup. This signals the far end terminal that a failure exists in the local terminal. The force digit 2 operation can be readily carried out by a simple logic circuit (e.g., an inhibited AND gate) which normally passes the D2 message bits, but inhibits the same and thereby forces D2=0 when LA=1.

As described in the above-cited article by Gaunt et al, the eighth bit (D8) of a channel is periodically dedicated for signaling purposes, such as on-hook (D8=0), off-hook (D8=1) and dialing digits. The LA and RA signals are ORed in FIG. 3 to provide a force on-hook signal (FONH). This FONH signal is used, in much the same way as FOD2, to force the extracted D8 signaling bits to zero and thereby simulate the on-hook condition for all channels in a troubled digroup. This results in the stopping of service charges and the withdrawal of the affected digroup(s) from service. The FONH signal is also coupled to a facilities maintenance center to advise the same that maintenance action is required for the digroup.

It is a particular advantage, realized in the common control failure alarm apparatus of the invention, that maintenance testing can be carried out with great facility. For example, a test vector (e.g., D2=0 test bits and/or test D9 framing bits) can be inserted in the time-slots of the test digroup and the performance of the common control circuitry thereby monitored at selected points while in service operation. The test vector is inserted at the multiplex point by strobing, for example, the bit stored in a ROM (read only memory). The test bits can, of course, also be inserted under a central processor control. It will be evident that the test bits can be used to simulate an out-of-frame ($\overline{IF}$) condition in the test digroup, a D2=0 remote failure indication, etc. The common control circuitry is monitored at selected points (e.g., the output of shift registers 304 and 504) and failures can thus be quickly detected and isolated. And, importantly, these maintenance procedures can be continuously carried out with the equipment in normal service operation.

It should be evident to those skilled in the art that the principles of the invention are applicable to systems wherein a greater, or lesser, number of digital groups are time multiplexed together, with each digital group having more, or less, than 24 channels.

Further, the invention as disclosed herein makes use of shift registers to provide the requisite shared memory. However, it will be evident to those in the art that a random access memory (RAM) might also be readily used for this purpose, the stored bits being read out of the RAM store and then recirculated back to store via appropriate logic circuitry (e.g., adder 303).

The above-described apparatus is considered to be merely illustrative of the application of the principles of the present invention and numerous variations and modifications thereof may be devised by those skilled in the art without departing from the spirit and scope of the invention.

What is claimed is:

1. In a time division multiplex system wherein a plurality of digital groups of time division multiplexed channels are time multiplexed together on to a common transmission link, a failure alarm circuit comprising timing store means for timing one or more selected failure indications for each digital group, status store means for maintaining a continuing real time record of the alarm status for each digital group, and decoder means for setting the alarm status record for a digital group to the alarm state and for clearing the timing store means for the digital group when the timing store means counts out a predetermined failure duration, said timing store means serving to time failure-free indications for a digital group after the alarm state is recorded for the same, said decoder means terminating the alarm state recorded for a ditigal group and clearing the timing store means for the digital group after said timing store means counts out a predetermined failure-free duration.

2. In a time division multiplex system wherein a plurality of digital groups of time division multiplexed channels are time multiplexed together on to a common transmission link, a failure alarm circuit comprising timing store means including a shared recirculating memory for timing one or more selected failure indications for each digital group, status store means including a shared recirculating memory for maintaining a continuing real time record of the alarm status for each digital group, and decoder means for setting the alarm status record for a digital group to the alarm state and for clearing the timing store means for the digital group when the timing store means counts out a predetermined failure duration, said timing store means serving to time failure-free indications for a digital group after the alarm state is recorded for the same, said decoder means terminating the alarm state recorded for a digital group and clearing the timing store means for the digital group after said timing store means counts out a predetermined failure-free duration.

3. In a time division multiplex system, a local failure alarm circuit as defined in claim 2 for monitoring selected local failure indications, a remote failure alarm circuit also as defined in claim 2 for monitoring the signal of each digital group for a remote failure indication, and means for coupling a signal from the local alarm circuit to the remote alarm circuit to maintain the existing remote alarm status for a digital group during the presence of a local failure indication.

4. In a time division multiplex system as defined in claim 3 wherein the failure and failure-free timing durations of the remote failure alarm circuit are substantially less than the failure and failure-free timing durations of the local failure alarm circuit.

5. A failure alarm circuit as defined in claim 2 wherein the shared recirculating memories comprise shift registers that are clocked in time coincidence with the appearance of the digital groups on the multiplexed transmission link.

6. A failure alarm circuit as defined in claim 5 wherein each of the shift registers comprises a number of cells that exceed by one the number of multiplexed digital groups.

7. In a time division multiplex system wherein a plurality of digital groups of time division multiplex channels are time multiplexed together on to a common bus, a local failure alarm circuit comprising timing store means including a shared recirculating memory for timing selected local failure indications for each digital group, status store means including a shared recirculating memory for maintaining a continuing real time record of the local alarm status for each digital group, and decoder means for setting the local alarm status record for a digital group to the local alarm state when the timing store means counts out a predetermined failure duration, said timing store means serving to time local failure-free indications for a digital group after the local alarm state is recorded for the same, said decoder means terminating the local alarm state recorded for a digital group after said timing store means counts out a predetermined failure-free duration; a remote failure alarm circuit comprising timing store means including a shared recirculating memory for timing a remote failure indication for each digital group, status store means including a shared recirculating memory for maintaining a continuing real time record of the remote alarm status for each digital group, and decoder means for setting the remote alarm status record for a digital group to the remote alarm state when the timing store means counts out a predetermined failure duration, said timing store means serving to time remote failure-free indications for a digital group after the remote alarm state is recorded for the same, said decoder means terminating the remote alarm state recorded for a digital group after said timing store means counts out a predetermined failure-free duration; and means for coupling a signal from the local alarm circuit to the remote alarm circuit to maintain the existing remote alarm status for a digital group during the presence of a local failure indication.

8. In a time division multiplex system as defined in claim 7 wherein the failure and failure-free timing durations of the remote alarm circuit are substantially less than the failure and failure-free timing durations of the local alarm circuit.

* * * * *